United States Patent Office.

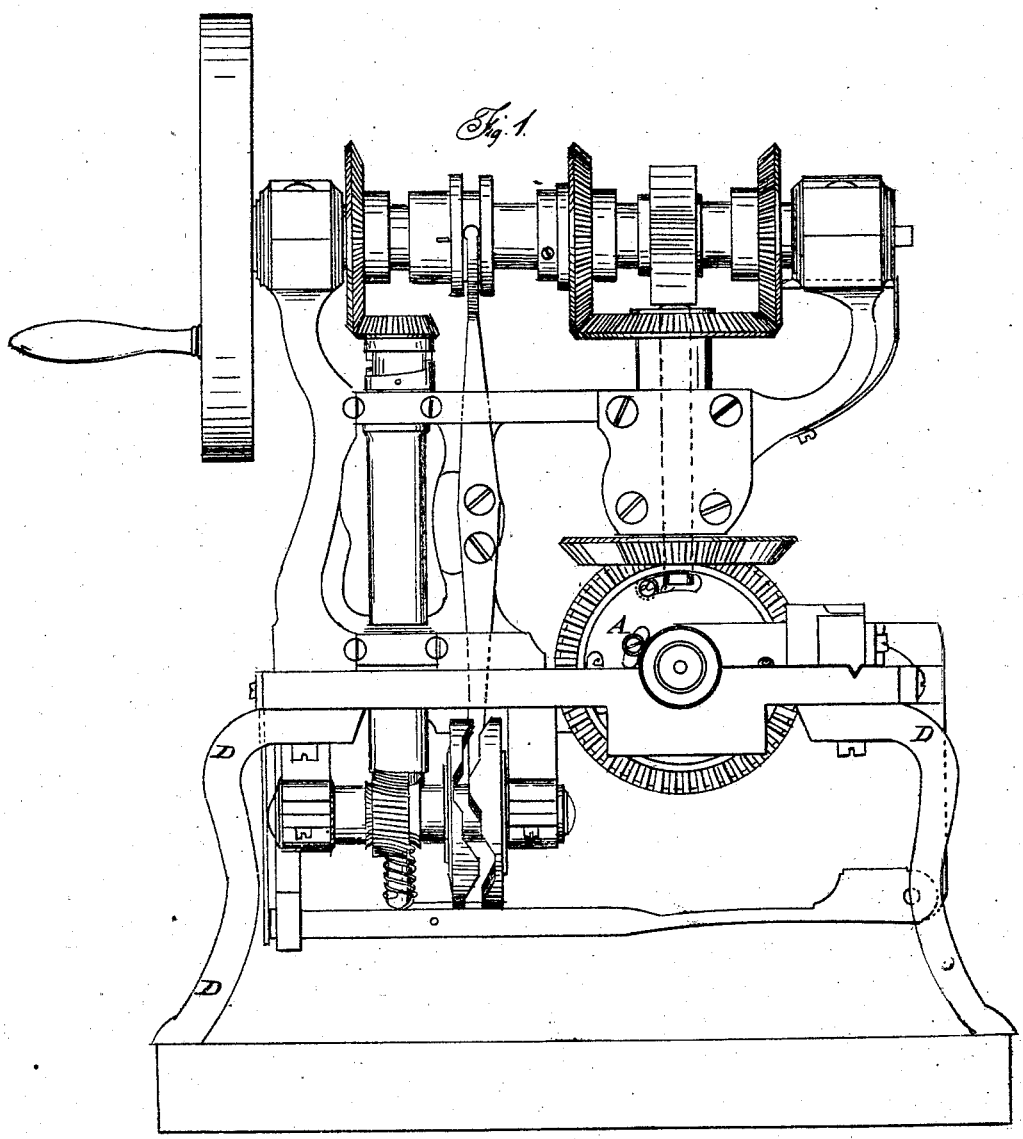

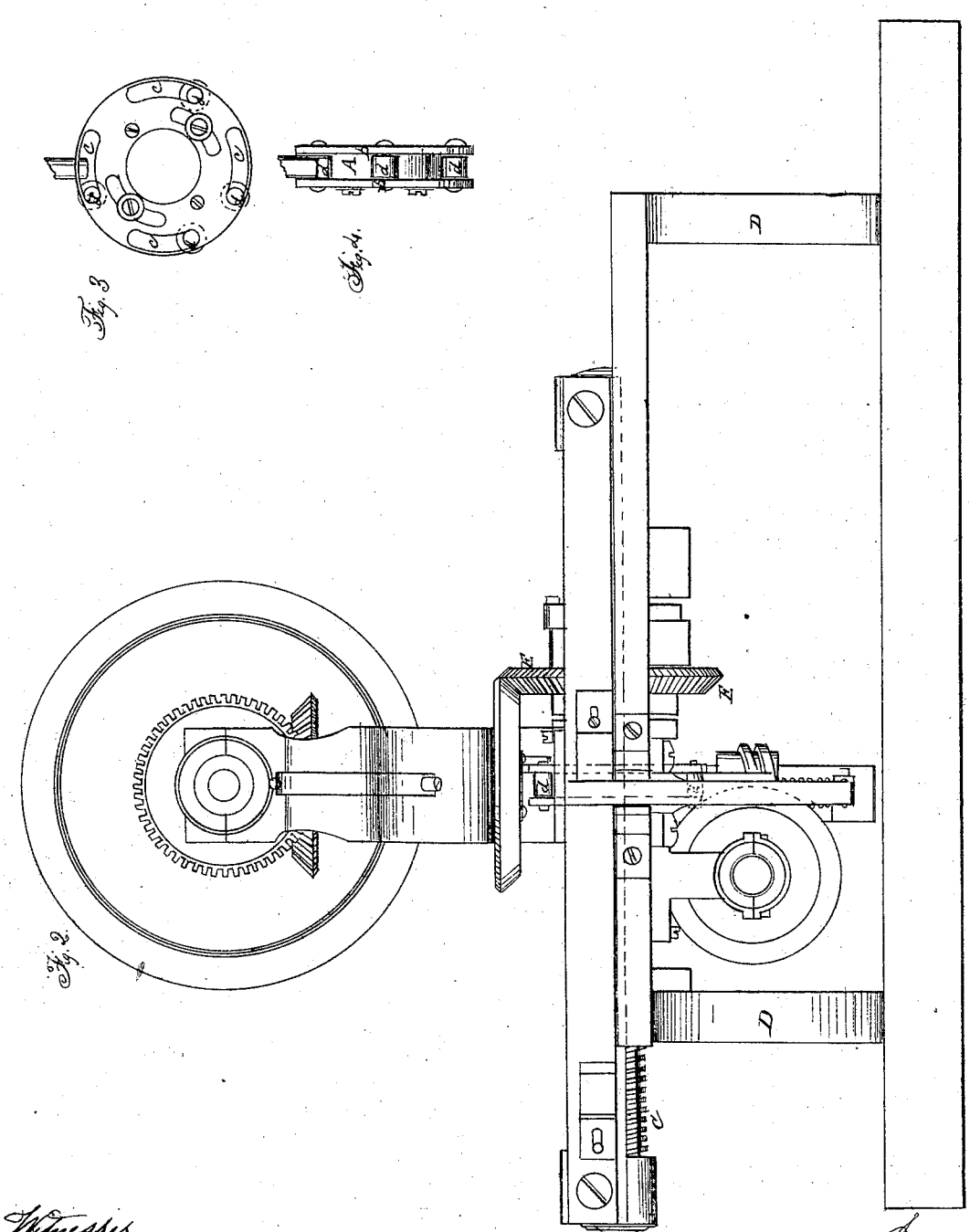

JAMES RUSSELL, OF SPRINGFIELD, MASSACHUSETTS.

Letters Patent No. 74,853, dated February 25, 1868.

IMPROVEMENT IN CARD-SETTING MACHINE.

*The Schedule referred to in these Letters Patent and making part of the same.*

TO ALL WHOM IT MAY CONCERN:

Be it known that I, JAMES RUSSELL, of Springfield, in the county of Hampden, and State of Massachusetts, have invented a new and useful Reversible Stop-Ring, for securing accurate time in machinery where intermittent motion is sought or required; and I do hereby declare that the following is a full and exact description.

The nature of my invention consists in providing machines, which are designed to work with intermittent motion, with a reversible ring, to be stopped at the desired intervals by a pin or plunger, to be worked by a cam or other suitable mechanism, the purpose being to stop the machine at the precise point required without permitting any throw after the motive-power is disconnected, thus stopping the operation of one part of the machine while the operation of another part of the machine is continued.

To enable others skilled in the art to make and use my invention, I describe it as follows:

I construct the ring of metal or other suitable material, and with two parallel flanges, and of such thickness as to admit the pin or plunger to pass between the flanges. In the flanges, at intervals to be determined by the requirements of the machine to which the ring is applied, are cut slots, into which are placed rollers, which move freely from end to end of the slots as the ring revolves. The slots, rollers, and pin or plunger, are of such relative size that, when the pin is in the slot, the roller being at one end of the slot, and the pin in the centre, there will be space at the other end of the slot just sufficient to contain a roller of the same size, so that, whichever way the ring may be running, the pin, striking the centre of the slot, will meet the roller, and stop the further motion. The arrangement or timing of the machine with the ring attached is such that the plunger is driven down into the slot at the instant when the motive-power leaves the part of the machine whose motion is to cease, and interposes a positive obstacle to any further movement, and prevents the throw of the machinery, which would otherwise occur.

By reference to the accompanying drawings, the operation and application of the invention may be seen.

Figure 1 shows a side view of the ring attached to a machine.

Figure 2, an end view of the ring attached to the same machine.

A is the ring; $b\ b$, fig. 2, are the flanges; $c\ c$, fig. 1, are the slots for the rollers; $d\ d$, figs. 1 and 2, are the rollers; B, fig. 2, is a screw-nut, to which the ring A is attached, and is revolved by the gears E F, fig. 2; I is the pin or plunger; K, the cam on the shaft $g$, which drives the pin I; C is the screw, whose motion is to be intermitted, in order that the carriage which it carries may stop at regular intervals for a fixed length of time.

The machine is so timed or arranged that, at the instant when the motive-power is disconnected with the screw C, the centre of the slot $c$ in the flange of the ring A arrives at the point immediately beneath the pin I, which, at the same instant, is driven by the cam K into the groove $a$, where it meets the roller $d$, and prevents any further movement of the ring, which prevents any further movement of the screw, and, therefore, prevents any further movement of the carriage, which depends on the screw for its motion.

The cam K, in its revolution, maintains a pressure on the pin I for the precise length of time during which the motion is to be suspended. When the pressure is removed, the pin I is lifted out of the periphery of the ring A by the action of the spring L. The motive-power is, at the same time, reapplied to the screw, and its motion renewed.

What I claim as my invention, and desire to secure by Letters Patent, is—

1. A reversible stop-ring, A, with its flanges $b\ b$, its slots $c\ c$, and its rolls $d\ d$, and groove $a$, constructed as herein described, and for the purposes specified.

2. I also claim, in combination with the above, a pin or plunger, I, worked by the cam K, as and for the purposes described.

JAMES RUSSELL.

Witnesses:
JAS. H. WOLCOTT,
A. L. SOULE.